(12) United States Patent
Ferguson et al.

(10) Patent No.: US 7,101,003 B2
(45) Date of Patent: Sep. 5, 2006

(54) HYBRID LASER AND INKJET PRINTER

(75) Inventors: Christa Ferguson, Round Rock, TX (US); Joshua N. Alperin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/044,127

(22) Filed: Jan. 27, 2005

(65) Prior Publication Data

US 2006/0164444 A1   Jul. 27, 2006

(51) Int. Cl.
*B41J 3/00* (2006.01)

(52) U.S. Cl. .......................................................... 347/2

(58) Field of Classification Search ..................... None
See application file for complete search history.

(56) References Cited

U.S. PATENT DOCUMENTS

| | | | |
|---|---|---|---|
| 4,366,508 A | 12/1982 | Crean et al. ................. 358/287 |
| 5,351,136 A | 9/1994 | Wu et al. .................... 358/440 |
| 5,600,712 A | 2/1997 | Hanson et al. ............... 379/142 |
| 5,751,299 A * | 5/1998 | Denton et al. .................. 347/2 |
| 5,758,081 A | 5/1998 | Aytac ..................... 395/200.41 |
| 5,760,928 A * | 6/1998 | Motoyama et al. ......... 358/501 |
| 5,761,565 A * | 6/1998 | Baker et al. .................... 399/2 |
| 5,769,515 A | 6/1998 | Chang ..................... 312/223.2 |
| 5,867,181 A * | 2/1999 | Nakane et al. .................. 347/2 |
| 5,973,866 A | 10/1999 | Tseng ......................... 359/896 |
| 6,178,016 B1 | 1/2001 | Ashe et al. ................. 358/487 |
| 6,281,988 B1 | 8/2001 | Leung ........................ 358/434 |
| 6,305,780 B1 | 10/2001 | Askren et al. ................ 347/37 |
| 6,360,336 B1 | 3/2002 | Christensen et al. .......... 714/47 |
| 6,471,333 B1 | 10/2002 | Powell et al. ................. 347/49 |
| 6,693,996 B1 | 2/2004 | Mansfield ................ 379/90.01 |

\* cited by examiner

*Primary Examiner*—Thinh Nguyen
(74) *Attorney, Agent, or Firm*—Hamilton & Terrile, LLP; Stephen A. Terrile

(57) ABSTRACT

A printer which includes both high volume printing capabilities such as laser jet printing with photographic quality printing capabilities such as ink jet or dye-sublimation printing within the same printer housing.

15 Claims, 2 Drawing Sheets

HYBRID LASER AND INKJET PRINTER

BACKGROUND OF THE INVENTION

1. Field of the Invention

The present invention relates to the field of printers and more particularly to hybrid laser and inkjet printers.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. One example of an information handing system is a printer.

Known printers often have different types of jobs that they perform well. For example, laser printers provide inexpensive high volume print jobs of bonded paper while ink jet printers provide photographic quality prints (e.g., color prints having at least 300 dots per inch resolution), often using specialized ink jet photo paper. Accordingly, it is desirable to provide a printer which includes both laser jet capabilities as well as ink jet capabilities.

SUMMARY OF THE INVENTION

In accordance with the present invention, a printer which includes both high volume printing capabilities such as laser jet printing with photographic quality printing capabilities such as ink jet or dye-sublimation printing within the same printer housing.

More specifically, in one embodiment, the invention relates to a hybrid printer that includes a printer housing, an ink jet printing portion, a laser jet printing portion and a paper handling mechanism. The ink jet printing portion provides ink jet printing functionality. The laser jet printing portion provides laser jet printing functionality. The paper handling mechanism moves paper through the printer.

In another embodiment, the invention relates to an information handling system which includes a housing, a photographic quality printing portion, a laser jet printing portion and a control system. The photographic quality printing portion provides photographic quality printing functionality. The laser jet printing portion provides laser jet printing functionality. The control system includes a processor and memory and controls whether a document is printed using the photographic quality printing portion or the laser jet printing portion. The paper handling mechanism moves paper through the information handling system.

In another embodiment, the invention relates to an apparatus for printing documents that includes housing, photographic quality printing means, laser jet printing means and a paper handling means. The photographic quality printing means provides photographic quality printing functionality. The laser jet printing means provides laser jet printing functionality. The paper handling means moves paper through the printer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
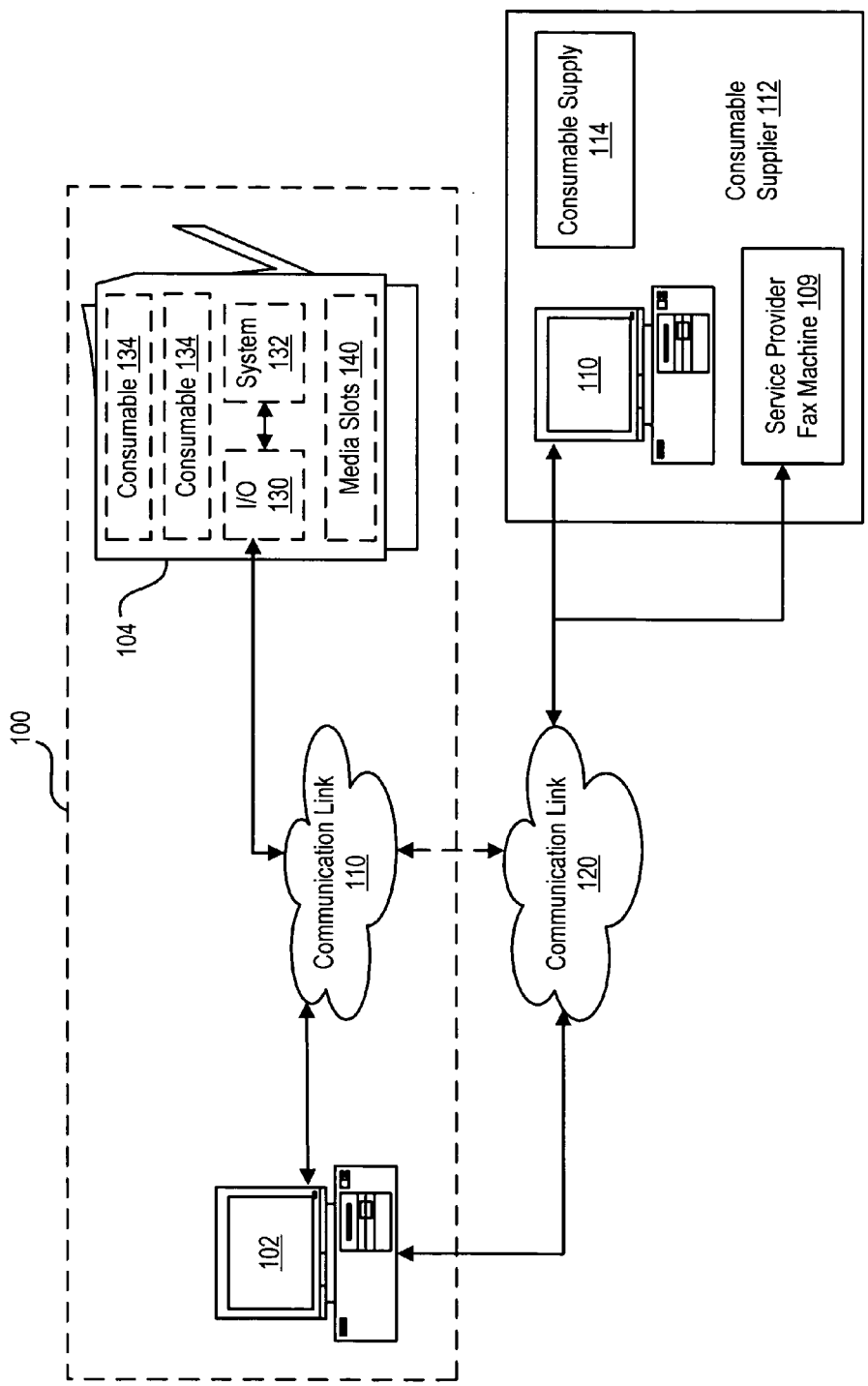
FIG. 1 shows a block diagram of an environment in which a hybrid laser printer is used.

Referring to FIG. 1, a block diagram of an environment in which a hybrid laser and inkjet printer is used is shown. The environment includes a computer system 102 and a hybrid printer 104, coupled via a communication link 110. The communication link 110 might be a printer cable, a telephone cable, a network connection or any other link which information is communicated with the hybrid printer 104. In one embodiment, the hybrid printer 104 is included within a multifunction device such as a combination printer fax machine. Other functions may also be included within the multifunction device such as a scan function and a copy function. Also, in one embodiment, the environment does not include a computer system 102.

The hybrid printer 104 is coupled to a second communication link 120. Thus, communication may occur between the hybrid printer 104 and anything coupled to the second communication link 120 such as a services provider fax machine 109. Additionally, the computer system 102 is also connected to another computer system (e.g., a services provider computer system) 110 via a second communication link 120. The second communication link 120 may be a telephone system or some other type of network, such as the Internet. In one embodiment, the fax machine 109 and the computer system 110 are owned and operated by a fax machine service provider 112. In this example, the printer service provider 112 provides service for the hybrid printer 104.

The hybrid printer 104 includes an input output (I/O) port 130, a control system 132 and at least two types of consumables 134. The I/O port 130 facilitates communications between the hybrid printer 104 and other devices connected to the communications link 110. The control system 132 provides the hybrid printer 104 with certain control functionality. The control system 132 includes a processor and memory coupled to the processor. The hybrid printer 104 may also include one or more media slots 140.

The consumables 134 represent any component in the hybrid printer 104 that is subject to depletion through use of the hybrid printer 104. For example, the consumable 134 may be a toner cartridge or an inkjet cartridge, etc. The hybrid printer service provider maintains a supply 114 of replacement consumables 134.

In operation, the computer system 102 generates a document in an electronic form and transmits the document (in the form of a print job) to the printer 104. The hybrid printer 104 receives the job via the I/O port 130 and prints the document. Additionally, when the hybrid printer 104 is part of a multifunction device, the hybrid printer 104 may receive and print information from the communication link 120 or from a scanned image when operating as a copier. Additionally, the hybrid printer 104 may receive and print information from any of its media slots 140.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
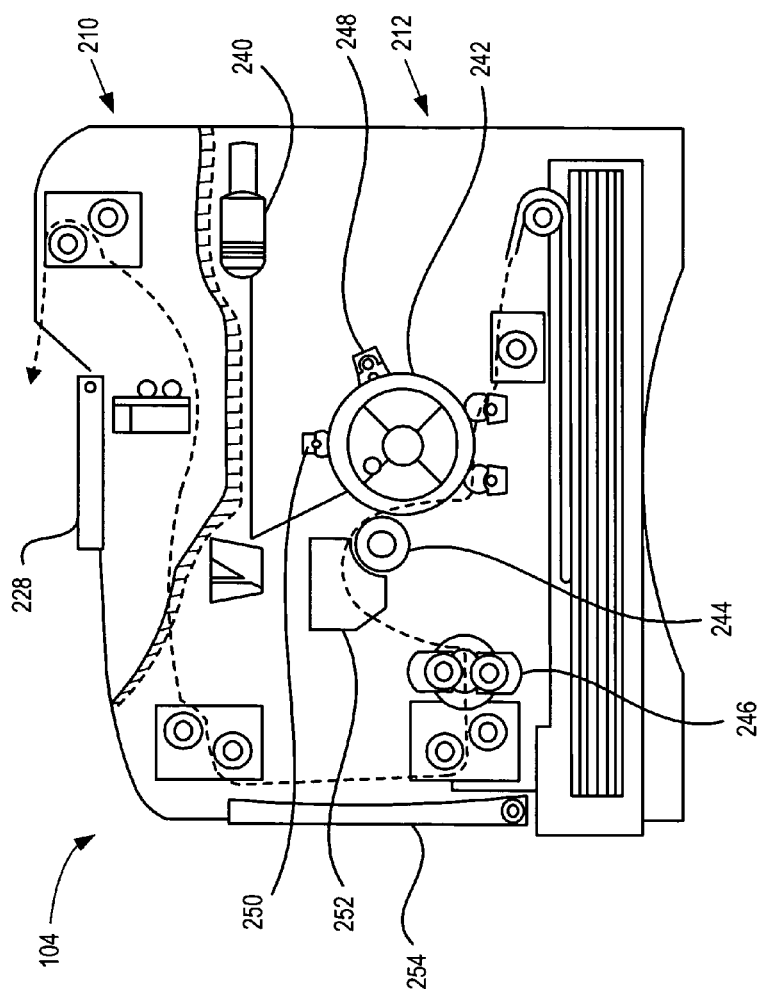
FIG. 2 shows a block diagram of a hybrid laser and inkjet printer.

Referring to FIG. 2, hybrid printer 104 includes an ink jet portion 210 and a laser jet portion 212 as well as a paper tray 214 all contained within a printer housing 216. The hybrid printer 104 also includes a paper handling mechanism for moving paper along a paper path through the printer housing. In one embodiment, the paper handling mechanism includes a plurality of rollers 218.

The ink jet portion 210 provides ink jet printing capabilities and includes the elements for printing an image via ink jet printing. The laser jet portion 212 provides laser jet printing capabilities and includes the elements for printing an image via laser jet printing. In a preferred embodiment, the ink jet portion 210 is positioned in the paper path after (i.e., downstream of) the laser jet portion 212 so that any heat that is generated during the laser jet printing would not affect the ink jet printing.

In one embodiment, the hybrid printer 104 includes a thermal insulator 216 positioned between the ink jet portion 210 and the laser jet portion 212. The thermal insulator 219 minimizes evaporation of the ink jet ink due to heat produced by the laser jet portion 212.

More specifically, the ink jet portion 210 includes at least one print head 220, an ink reservoir 222 (which may be combined as an ink jet cartridge), as well as guide rails 226 along which the print head 220 and the ink reservoir 222 move. Often the ink jet cartridge is a printer consumable 134. The inkjet portion 210 of the hybrid printer 104 includes an ink jet consumable access door 228.

The laser jet portion includes a laser scanning unit 240, a photoreceptor drum assembly 242, a developer roller 244, a fuser 246, a discharge lamp 248 a corona wire 250 and a toner hopper 252. The toner hopper 252 is a printer consumable 134. The laser jet portion 210 includes a laser jet consumable access door 254.

By combining ink jet functionality with laser jet functionality within a single hybrid printer, the hybrid printer is capable of printing low cost, high duty rate documents using the laser jet portion, while printing photo quality prints using the ink jet portion.

Additionally, the control system 132 of the hybrid printer (or alternately, a printer device driver that is executing on the computer 102) allows a number of unique control functions to be implemented which take advantage of the dual capabilities of the hybrid printer 104. For example, the control system 132 enables the printer 104 to print combined laser jet, ink jet documents (e.g., laser jet might be used for text portions of a document while the ink jet is used for photo portions of the document.) Additionally, for example, the control system 132 can provide the hybrid printer 104 with a fast print function in which the ink jet portion 210 is used while the laser jet portion is warming up. Additionally, the control system 132 can track consumable use for both the ink jet consumables as well as the laser jet consumables and can switch to the user of the other type of consumable when a particular consumable is depleted. (E.g., the ink jet black ink could be used for printing black and white documents if the laser portion consumable is depleted.) Enabling switching of the type of printer consumable used is especially advantageous when the printer consumables are supplied by a remote consumable supplier 112.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling submodules may be decomposed so that each sub-module performs its function and passes control directly to another sub-module.

Also for example, it will be appreciated that the laser jet portion 212 can include color laser jet functionality. In such a system, the control system 132 can track each of the color laser jet printer consumables and selectively use the corresponding ink jet when a particular color laser jet printer consumable is depleted.

Also for example, the ink jet printing portion 210 could include a separate paper tray for holding ink jet compatible paper.

Also for example, it will be appreciated that the consumable provider and the printer supplier could be the same entities or different entities.

Also for example, the ink jet printing portion 210 may be other known types of photographic quality printing mechanisms such as a dye-sublimation printing mechanism.

Also for example, the housing of the hybrid printer 104 may be configured so that the ink jet printing portion 210 may be optionally included as a secondary module such that a laser printer may be ordered with or without the inclusion of the ink jet printing portion 210. In this case, the ink jet printing portion 210 would be a removable attachment.

Also for example, the hybrid printer 104 may further include a paper storage bin to buffer paper that is printing from the laser printing portion and also on the ink jet printing portion 210. This paper storage bin would thus address the faster print speed of the laser printing portion 210 when documents are being printed using both the laser printing portion and the ink jet printing portion.

Also for example, the printer housing may also include an active heat dissipation device such as a fan or a heat sink to remove heat from the laser jet printing portion 212 before the heat affects the ink jet printing portion 210.

Also for example the paper handling mechanism can provide optional direct to ink jet or direct to laser paper paths, thus enabling the system control to generate concurrent print jobs on the respective printing portions.

Consequently, the invention is intended to be limited only by the spirit and scope of the appended claims, giving full cognizance to equivalents in all respects.

What is claimed is:

1. A hybrid printer comprising:
   a printer housing;
   an ink jet printing portion within the printer housing, the inkjet printing portion providing ink jet printing functionality;
   a laser jet printing portion within the printer housing, the laser jet printing portion providing laser jet printing functionality,
   a paper handling mechanism, the paper handling mechanism moving paper through the printer so that the laser jet printing portion is upstream of the ink jet printing portion; and,
   a thermal insulator positioned between the ink jet printing portion and the laser jet printing portion.

2. The hybrid printer of claim 1 further comprising:
   an ink jet door positioned to provide access to the ink jet printing portion.

3. The hybrid printer of claim 1 further comprising:
   a laser jet door positioned to provide access to the laser jet printing portion.

4. The hybrid printer of claim 1 further comprising:
   a control system, the control system controlling whether to print a document using the ink jet printing portion or the laser jet printing portion.

5. The hybrid printer of claim 1 further comprising:
   a control system, the control system controlling whether to print a document using the ink jet printing portion or the laser jet printing portion based upon ink jet consumable consumption and laser jet consumable consumption.

6. An information handling system comprising:
   a housing;
   a photographic quality printing portion within the housing, the photographic quality printing portion providing photographic quality printing functionality;
   a laser jet printing portion within the housing, the laser jet printing portion providing laser jet printing functionality,
   a control system, the control system including a processor and memory, the control system controlling whether a document is printed using the photographic quality printing portion or the laser jet printing portion;
   a paper handling mechanism, the paper handling mechanism moving paper through the information handling system; and,
   a thermal insulator positioned between the photographic quality printing portion and the laser jet printing portion.

7. The information handling system of claim 6 further comprising:
   a door positioned to provide access to the photographic quality printing portion.

8. The information handling system of claim 6 further comprising:
   a laser jet door positioned to provide access to the laser jet printing portion.

9. The information handling system of claim 6 wherein:
   the photographic quality printing portion includes at least one of ink jet printing capabilities and dye-sublimation printing capabilities.

10. The information handling system of claim 6 wherein:
    the control system controls whether to print a document using the photographic quality printing portion or the laser jet printing portion based upon photographic quality consumable consumption and laser jet consumable consumption.

11. An apparatus for printing documents comprising:
    a housing;
    a photographic quality printing means within the printer housing, the photographic quality printing means providing photographic quality printing functionality;
    a laser jet printing means within the printer housing, the laser jet printing means providing laser jet printing functionality,
    a paper handling means, the paper handling means moving paper through the printer; and
    a thermal insulator positioned between the photographic quality printing means and the laser jet printing means.

12. The apparatus of claim 11 further comprising:
    a door positioned to provide access to the photographic quality printing means.

13. The apparatus of claim 11 further comprising:
    a laser jet door positioned to provide access to the laser jet printing means.

14. The apparatus of claim 11 further comprising:
    a control means, the control means controlling whether to print a document using the photographic quality printing means or the laser jet printing means.

15. The apparatus of claim 11 further comprising:
    a control means, the control means controlling whether to print a document using the photographic quality printing means or the laser jet printing means based upon photographic quality consumable consumption and laser jet consumable consumption.

* * * * *